United States Patent [19]

Dzurilla et al.

[11] 3,861,979

[45] Jan. 21, 1975

[54] FIXING OF SLABS TO WALL SURFACES

[75] Inventors: Robert Richard Dzurilla, Seven Hills; Edward John Jago, Berea, both of Ohio

[73] Assignee: Foseco Trading A.G., Chur, Switzerland

[22] Filed: Sept. 25, 1972

[21] Appl. No.: 291,718

Related U.S. Application Data

[63] Continuation of Ser. No. 832,818, June 12, 1969, abandoned.

[52] U.S. Cl. ................ 156/313, 156/290, 156/291, 156/295, 156/309, 156/320, 156/321, 156/322, 156/330, 164/137, 249/201
[51] Int. Cl. ........................... C09j 5/00, C09j 7/04
[58] Field of Search ...... 29/187; 156/278, 290, 291, 156/295, 309, 313, 320, 321, 322, 330; 249/201; 164/137

[56] References Cited
UNITED STATES PATENTS

| | | | |
|---|---|---|---|
| 1,960,177 | 5/1934 | Weber | 156/313 |
| 2,060,906 | 11/1936 | Smyder | 156/313 X |
| 2,544,169 | 3/1951 | Manning | 156/321 |
| 3,239,403 | 3/1966 | Williams | 156/291 X |
| 3,539,413 | 11/1970 | Eccleston | 156/321 |
| 3,672,427 | 6/1972 | Cooley | 164/137 |
| 3,749,628 | 7/1973 | Nancarrow | 156/309 |

FOREIGN PATENTS OR APPLICATIONS

| | | | |
|---|---|---|---|
| 549,925 | 12/1957 | Canada | 156/310 |

*Primary Examiner*—George F. Lesmes
*Assistant Examiner*—Ellis P. Robinson

[57] ABSTRACT

Hot top lining slabs or other articles may be affixed to a receptor surface by affixing to the slab or article a strip bearing a bead of a resin which on heating successively melts, sticks and sets, bringing the strip so fixed into contact with the receptor surface and heating it.

2 Claims, No Drawings

FIXING OF SLABS TO WALL SURFACES

This is a continuation of application Ser. No. 832,818, filed June 12, 1969, now abandoned.

The present invention relates to the fixing of slabs of material to a surface by means of an adhesive, and more particularly to fixing heat insulating hot-top lining slabs to the walls of ingot moulds, or to head boxes for such moulds, by such methods. Although the following description will, for the sake of clarity and simplicity, mostly be restricted to a description of such latter use it will be appreciated that the method to be described is of general application to a wide variety of particular adhesion problems.

According to the present invention there is provided a strip of material adapted to be attachable to a slab or the like to be fixed to a surface, and having on one side thereof a bead of a resinous substance which on heating first softens to a tacky condition and thereafter sets to an infusible condition. Resins for use in the invention may also be defined as "arrested adhesive resins" by which is meant a resin the formulation of which has been arrested during its production, usually by cooling it or by rapid solvent evaporation, and which on heating melts, continues its formation and subsequently thermo sets. Typical of such resins are stage B arrested epoxy resins.

The strip of material is preferably flexible and slightly wider than the bead of resin thereupon. The flexibility enables the strip easily and quickly to be applied to the slab or like shape to be affixed, and to conform to the overall surface contour thereof. The bead of resin may advantageously also be notched or corrugated to increase its own flexibility. The edge portions of the strip may be used for securing the strip to the slab or the like, for example by means of staples, nails, drawing pins (thumb-tacks).

The strip of material is most preferably a strip of textile material, for example cotton, jute or linen webbing, onto which the resin may be cast in order to ensure a strong bond between the strip of material and the bead of resin itself. Preferably, the strip is sufficiently porous to allow the adhesive, when molten, to pass through the strip and adhere to the slab or the like.

According to a further feature of the invention there is provided a method of attaching an article to a surface which comprises attaching to the article a length of a strip of material of the type defined above, and applying with heating the bead of adhesive to the surface to which the article is to be affixed and allowing the resin to melt and thermoset to bond the article to said surface.

It is often convenient to arrange that the surface onto which the article is to be affixed is itself hot, for example this is usually the care when such surface is an ingot mould wall or a head box for such a mould.

The present invention thus provides a quickly and simply usable adhesive strip which can be stored ready for use and then merely cut to the desired length, applied to the article, such as a heat-insulating slab, and then adhered to the mould wall.

The following example will serve to illustrate the invention:

EXAMPLE

| A mixture was made up of: | |
|---|---|
| epoxy resin (Epikote 828XA - Shell Chemicals Ltd) | 100 parts |
| A mixture was made up of: | |
| silica flour | 285 parts | and to this was subsequently added 27 parts of diaminodiphenylmethane (Hardener B.250 - BASF). The resulting paste was extruded via a cold water bath onto a strip of fabric material. Such strips were applied to the surfaces of hot top lining slabs by nailing. These slabs could be used immediately on hot or cold ingot moulds and hot tops or, if the resin were allowed to become brittle, only on moulds and hot tops above 70°C.

We claim:

1. In the fixing of a hot top lining slab to a surface of a member selected from the group consisting of ingot moulds and head boxes, the steps of affixing to the hot top lining slab a strip of textile material bearing on the side thereof facing away from the hot top lining slab a bead of a resinous substance which on heating first softens to a tacky condition and thereafter sets to an infusible condition, locating the hot top lining slab adjacent said surface to which the slab is to be fixed with the bead of resinous substance engaging said surface to which the hot top lining slab is to be attached, heating said bead and allowing the resinous substance to melt and thermoset to bond the hot top lining slab to said surface.

2. The method of claim 1 in which the surface to which the hot top lining slab is to be attached is heated prior to contacting the bead of resinous substance therewith.

* * * * *